(12) United States Patent
Lindenmeier

(10) Patent No.: US 6,911,946 B2
(45) Date of Patent: Jun. 28, 2005

(54) ANTENNA ARRANGEMENT FOR SATELLITE AND/OR TERRESTRIAL RADIO SIGNALS FOR MOTOR VEHICLES

(75) Inventor: Heinz Lindenmeier, Planegg (DE)

(73) Assignee: FUBA Automotive GmbH & Co. KG, Bad Salzdetfurth (DE)

( * ) Notice: Subject to any disclaimer, the term of this patent is extended or adjusted under 35 U.S.C. 154(b) by 0 days.

(21) Appl. No.: 10/377,466

(22) Filed: Feb. 28, 2003

(65) Prior Publication Data

US 2003/0164802 A1 Sep. 4, 2003

(30) Foreign Application Priority Data

Mar. 1, 2002 (DE) .......................................... 102 09 060

(51) Int. Cl.[7] .............................................. H01Q 1/32
(52) U.S. Cl. ...................................... 343/713; 343/797
(58) Field of Search ............................... 343/713, 797, 343/853, 751

(56) References Cited

U.S. PATENT DOCUMENTS 5,952,983 A * 9/1999 Dearnley et al. ........... 343/817
6,317,098 B1 * 11/2001 Andrews et al. ............ 343/797
6,356,242 B1 * 3/2002 Ploussios .................... 343/797
6,542,128 B1 * 4/2003 Johnson et al. ............. 343/742

OTHER PUBLICATIONS

Patsiokas et al.: Satellite; SAE 2001–01; ISSN 0148–7191, Mar. 2001.

* cited by examiner

Primary Examiner—Don Wong
Assistant Examiner—Ephrem Alemu
(74) Attorney, Agent, or Firm—Collard & Roe, P.C.

(57) ABSTRACT

A reception antenna arrangement for motor vehicles for the GHz frequency range that is formed as a combined system for the reception of circularly polarized waves and/or vertically polarized waves by a plurality of dipole antennas. Their length is not greater than ¾ of the wavelength. To form a diversity function, at least one switching or reversing device (2) is provided so that at least two signals that are different in terms of diversity and received from the dipole antennas are alternatively supplied to at least one antenna connection point for diversity reception so that one or several more favorable reception signals can be selected and provided to the antenna amplifiers.

14 Claims, 15 Drawing Sheets

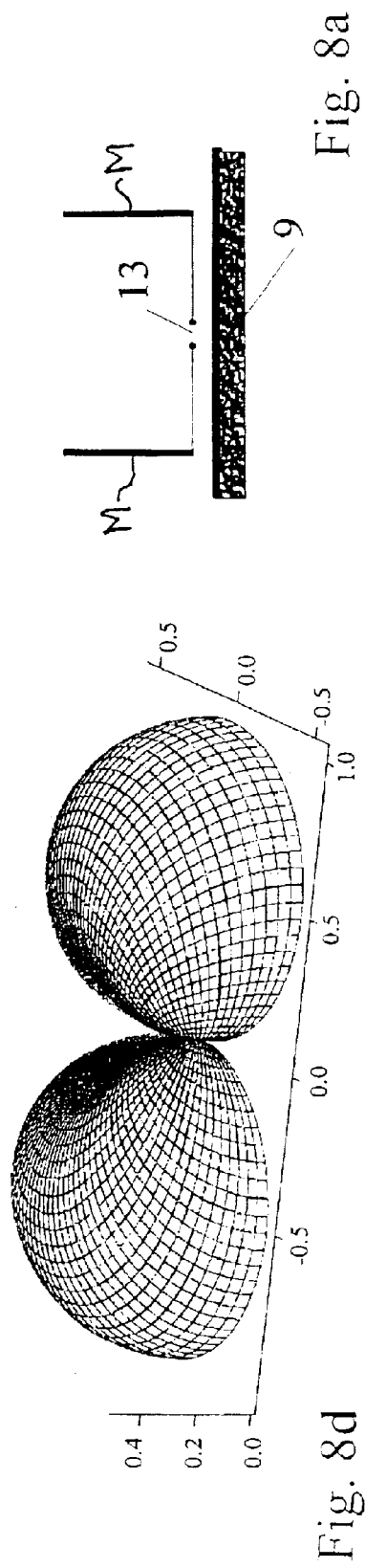
Fig. 8a
Fig. 8d
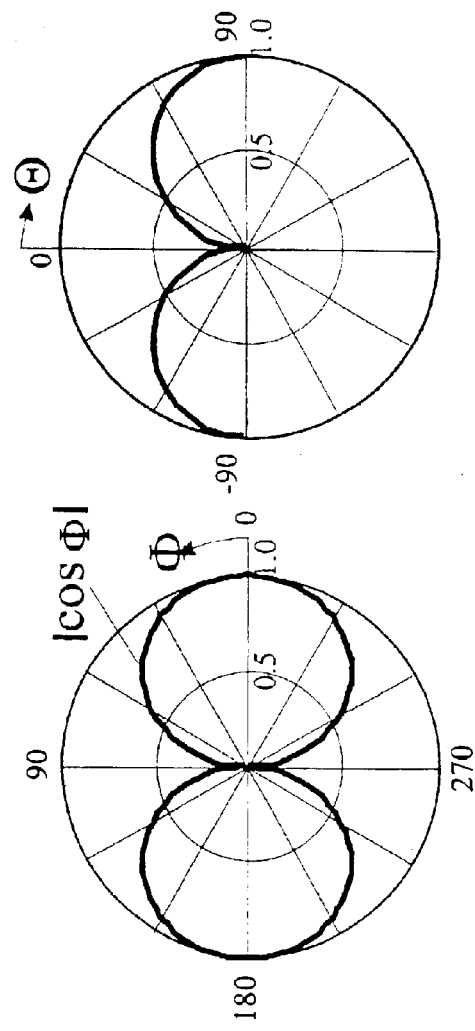
Fig. 8c
Fig. 8b

ANTENNA ARRANGEMENT FOR SATELLITE AND/OR TERRESTRIAL RADIO SIGNALS FOR MOTOR VEHICLES

BACKGROUND OF INVENTION

1. Field of Invention

This invention relates to a Reception Antenna Arrangement for Satellite And/or Terrestrial Radio Signals on Motor Vehicles

2. Prior Art

Satellite radio signals in satellite radio systems such as in the satellite radio system known as the SDARS, are transmitted with circular polarization, as a rule. For reception regions with substantially free propagation, a directional diagram with an azimuthal round diagram with a gain of about 3dBi for angles of elevation greater than 20 or 30 degrees is required to receive these signals. Antennas of this type and the requirements that have to be satisfied by the directional diagram are described, for example in PATSIO-KAS ET AL: Satellite; SAE 2001-01; ISSN 0148-7191,3/2001. The relatively high requirement with respect to the gain in the range of low elevation angles is conditioned by the low angles of incidence of the satellite radio waves that frequently occur because of the positions of the satellites.

To support the supply of satellite radio systems with satellite radio signals, such as with the SDARS system, additional terrestrial radio stations operating on a transmitting frequency that slightly deviates from the satellite radio frequency are provided. The terrestrially transmitted waves are vertically polarized. To receive these signals the object is to azimuthally aim for a round diagram of the receiving antenna with a heightened gain at low angles of incidence, and with the omission of high gain values in connection with steep radiation, i.e. for about the directional diagram of a vertical, linear antenna. A combination antenna of this type is also specified in the literature source cited above. Transmitting the same information content of additional terrestrial radio stations, which reaches the receiver with minor time offset, is provided particularly for populated regions. In the event of any discontinuance of the satellite radio connection caused by shadowing due to buildings, trees etc., the total receiving information is coordinated in the digital plane of the receiver and united to form the radio signal. To further support the transmission reliability for the radio signal, a second time-offset satellite signal is provided in connection with the SDARS systems with the same information content so as to secure an optimal reception result.

In urban areas, the wave directly incident from the satellite is frequently superposed by waves scattered on objects, so that a Rice distribution of the antenna reception signals occurs, and, if the direct sight connection to a satellite breaks off, even a Rayleigh distribution will frequently occur as well. Measurements have shown that the local signal fading, events caused thereby may lead to a substantial loss of information even at frequencies of around 2.3 GHz due to the depth of the signal fading and because of the low signal levels of the satellite radio signals in the receiver. Even though these effects are counteracted, for example in SDARS systems, with the help of the multiple supply with two satellite signals, and in urban regions with an additional terrestrial supply, a break-off or loss of the radio connection occurs only in isolated cases. Building this break-off up again takes up an annoying amount of time because of the required coordination and synchronization of the components of the information individually received in the receiver.

SUMMARY OF THE INVENTION

The invention provides an antenna arrangement for motor vehicles for the Ghz frequency range, for the reception of circularly polarized waves and/or vertically polarized waves by having a combination of dipole antennas. The spread of this antenna combination is in no spatial direction generally greater than ¾ of the received wavelength. In order to provide a diversity function, a reversing device is used wherein when, at least two signals are received from the dipole antennas where the signals are different in terms of diversity, they are alternatively supplied to at least one antenna connection point for diversity reception. Thus, one or more favorable reception signal can be selected.

Therefore, it is an object of the present invention to avoid this drawback in a reception arrangement and to substantially reduce the interference probability and thus significantly enhance the quality of the signals both in regions with undisturbed incidence of the waves, and in regions with multi-way propagation.

Other objects and features of the present invention will become apparent from the following detailed description considered in connection with the accompanying drawings which disclose several embodiments of the present invention. It should be understood, however, that the drawings are designed for the purpose of illustration only, and not as a definition of the limits of the invention.

BRIEF DESCRIPTION OF THE DRAWINGS

In the drawings, wherein similar reference characters denote similar elements throughout the several views:

FIG. 5b shows a vertical angle elevation diagram for the dipole of FIG. 5a.

FIG. 6b shows a horizontal phase diagram of the electrical dipole of FIG. 6a;

FIG. 6c shows a vertical phase diagram of the dipole of FIG. 6a;

FIG. 6d shows a three dimensional directional diagram of the reception signal of the dipole of FIG. 6a;

FIG. 8a shows a U-Adcock antenna disposed over a conductive surface of a vehicle;

FIG. 8b shows the horizontal diagram of a U-Adcock of FIG. 8a;

FIG. 8c shows the vertical diagram of a U-Adcock antenna of FIG. 8a;

FIG. 8d shows a three dimensional directional diagram for the U-Adcock antenna of FIG. 8a;

FIG. 9b shows a reversing or change-over device for the antenna arrangement of FIG. 9a;

FIG. 10b shows a reversing device for the arrangement of FIG. 10a with additional connection gates as compared to the device of FIG. 9a;

DETAILED DESCRIPTION OF PREFERRED EMBODIMENTS

Figure 1:
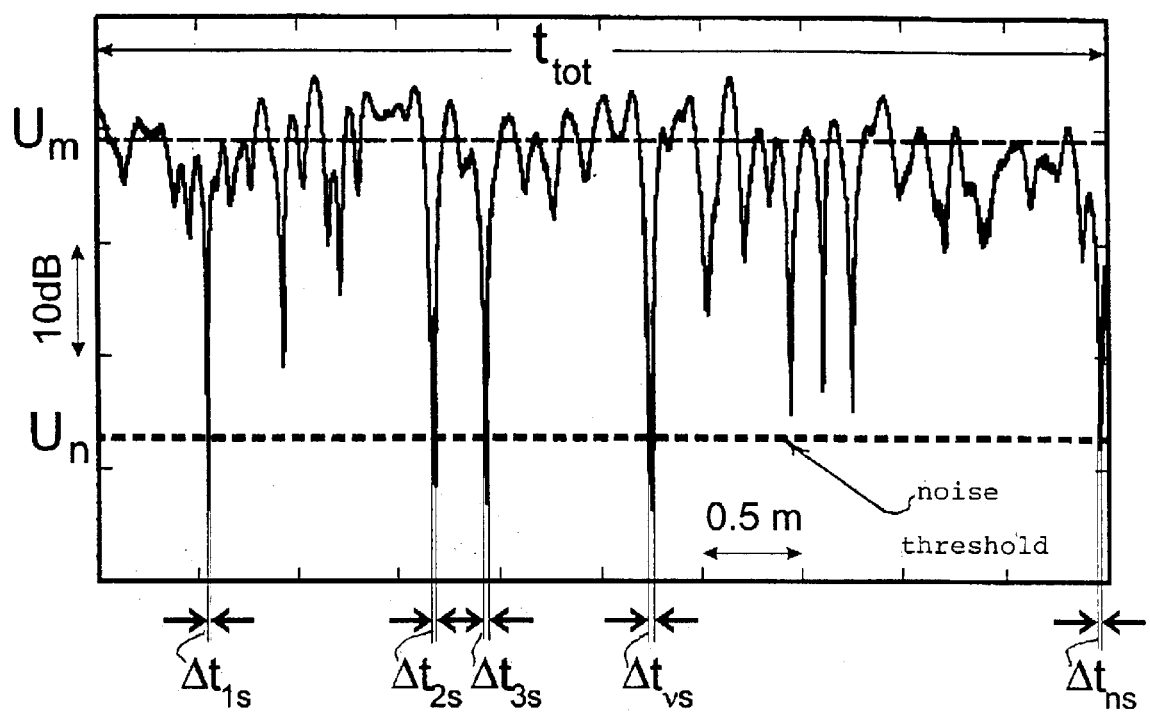
FIG. 1 is a chart showing the definition of the interference probability the signal quality, and the diversity efficiency, with the help of the level curve time with respect to time.

Referring to FIG. 1, there is shown an example of reception levels measured in urban regions and resulting level variations. The Rayleigh distribution shown has a mean level value Um. If the actual level falls short of the noise threshold Un, interference will occur. The interference probability $p_s$ describes the sum of the relative time intervals at which an interference will occur in the course of a drive by a vehicle. The Definition of the interference probability p and the signal quality q are:

$$p_s = \frac{\sum_v \Delta t_{vs}}{t_{tot}} \quad q_{s,d} = 20\log\{1/p_{s,d}\} \quad p_d = \frac{\sum_v \Delta t_{vd}}{t_{tot}}$$

Figure 3:
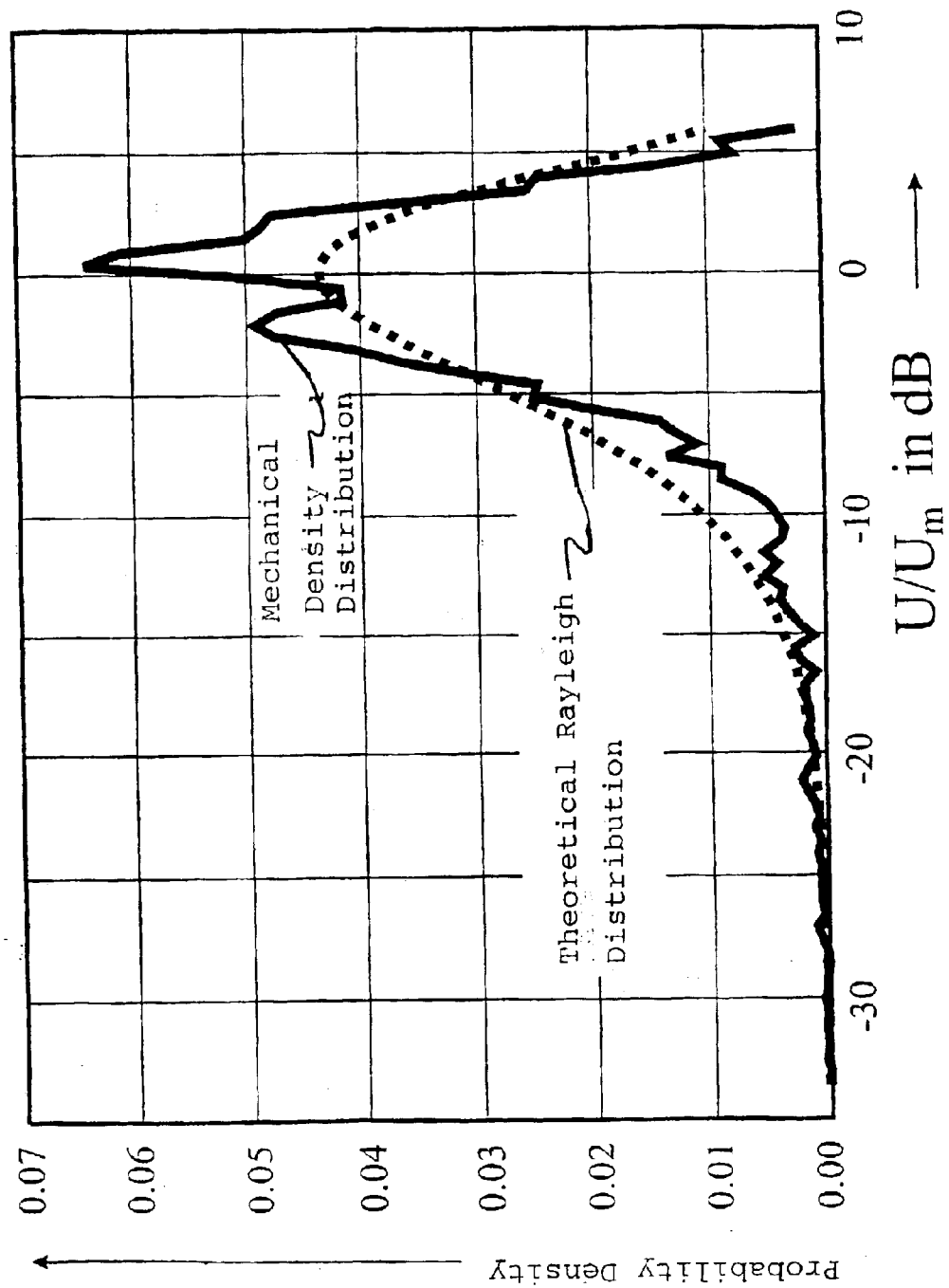
FIG. 3 shows the comparison of the probability density of the level curves of measured and theoretical values.

Thus, the Diversity efficiency n of the Antenna diversity system is: $n = q_d/q_s$ The drawback of a receiving system with an antenna for circular polarization and, if required, vertical polarization, with separate outputs, is that level fading of the type and in the order of magnitude shown in FIG. 1 may occur in disturbed regions, both in the satellite reception signal and the terrestrial reception signal. To substantiate this finding, the measured probable density distribution of the reception level and a theoretically obtained Rayleigh distribution with the same effective value Um are compared in FIG. 3.

According to the invention, it is possible to combine dipole antennas which are switched together with phase elements to generate a directional diagram for circular polarization for satellite reception, or provide vertical monopoles for receiving terrestrial signals, in order to derive a diversity function.

Figure 2:
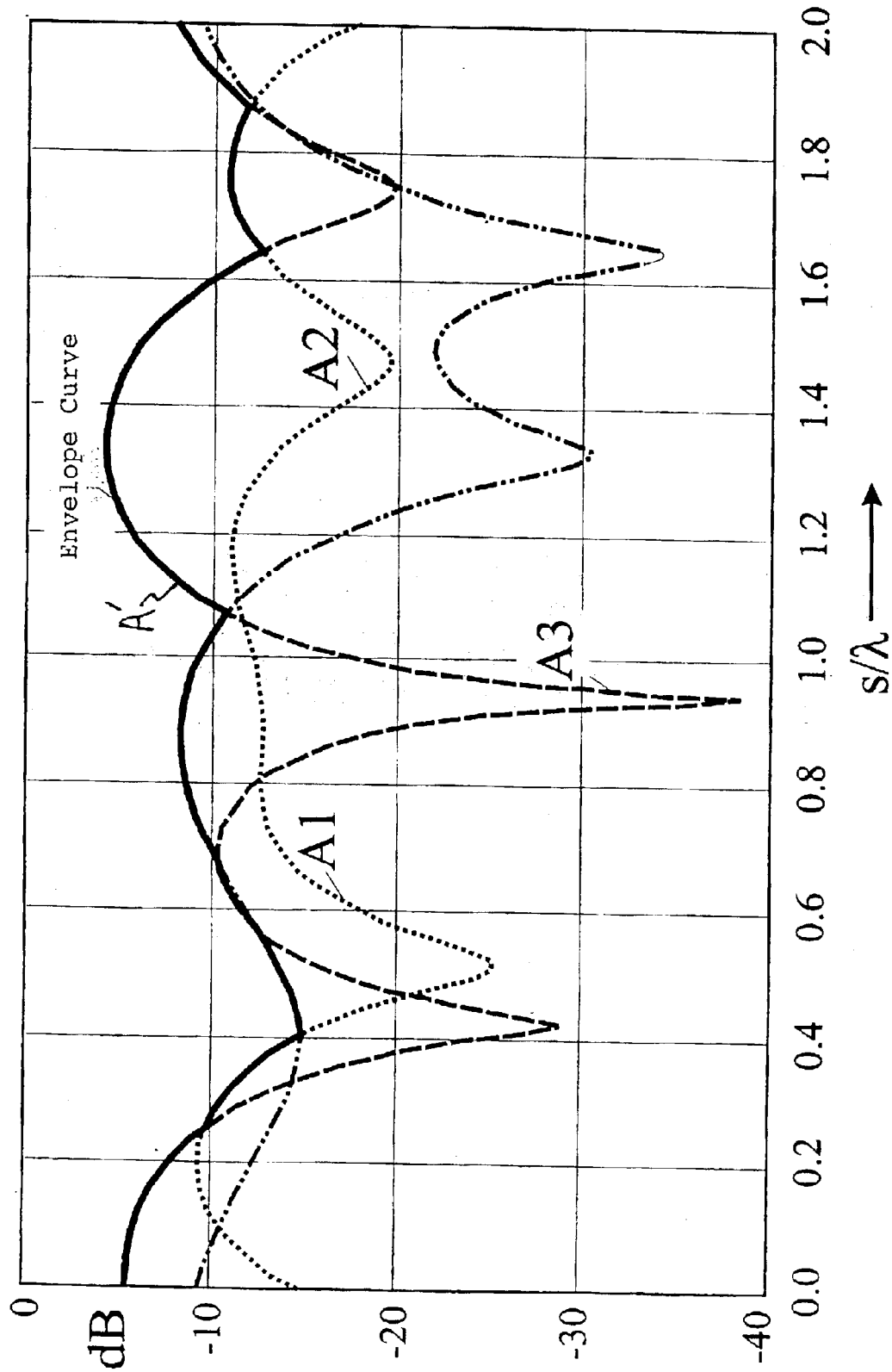
FIG. 2 shows the signal curves of three different antenna signals and their envelope with respect to the traveled distance.

FIG. 2 shows the typical level curves A1 to A3 of three reception signals of different antennas with dipole designs that are separately received. The thickly drawn envelope curve A' shows in each case, the strongest signal that is selected with the help of a diversity processor and a reversing or change-over device, and switched through to the receiver. Thus the invention provides individual antennas combined in the antenna arrangement from dipole antennas that serve as adequately de-correlated antennas that are separated from one another.

Figure 4B:
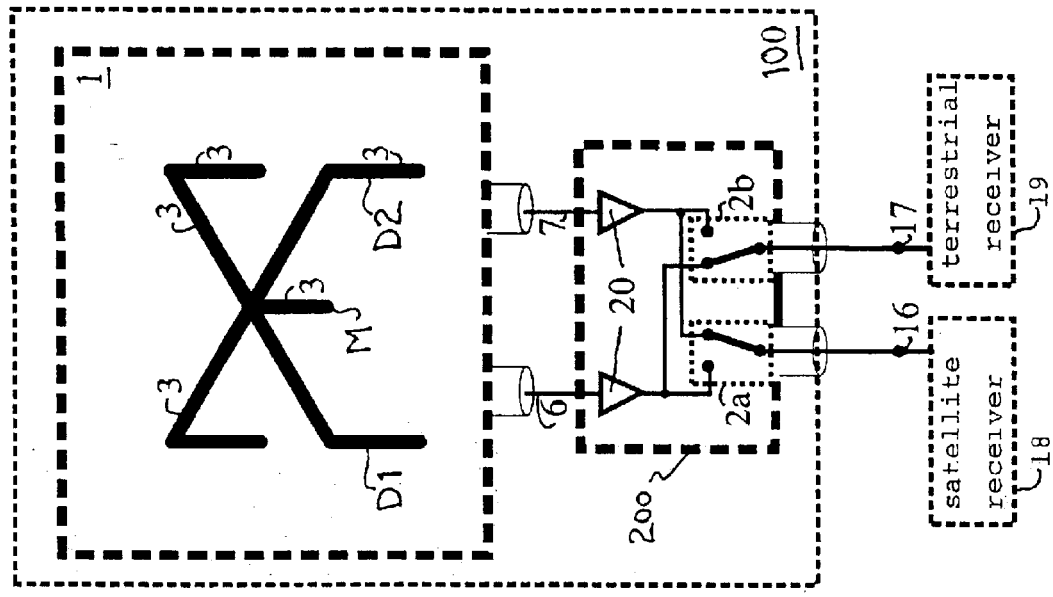
FIG. 4b shows a circuit similar to FIG. 4a supplemented by a receiver for terrestrial and satellite reception.
Figure 4A:
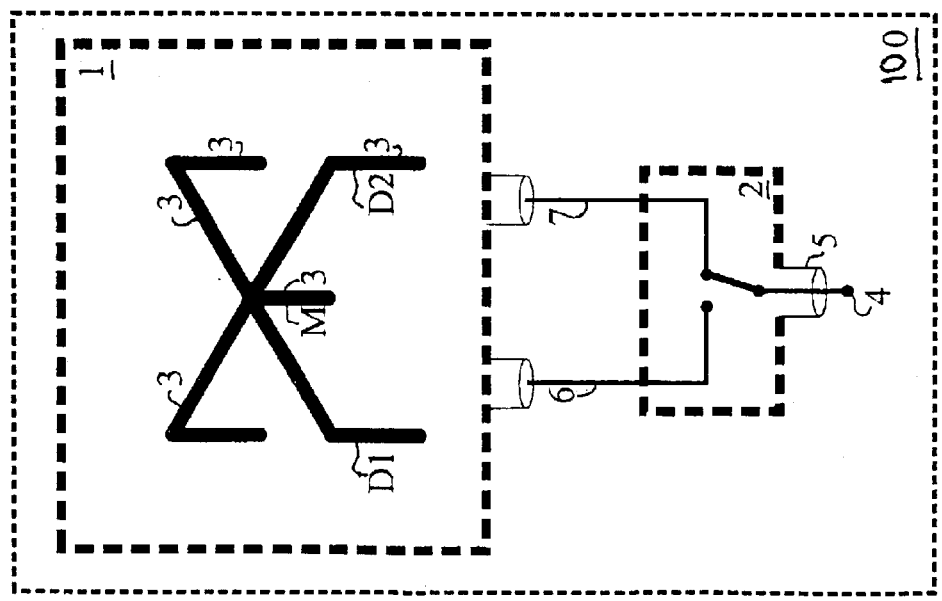
FIG. 4a shows an antenna circuit arrangement as defined by the invention.

FIG. 4a shows a reception antenna arrangement 100 that represents the simplest form of the invention. This arrangement comprises a receiving antenna having dipole antennas D1 and D2 with arms 3 for the reception of circularly polarized satellite signals on satellite connection gate 6, a center leg M and for the reception of vertically polarized terrestrial signals on terrestrial connection gate 7. According to the invention, it is now possible in regions with multi-way propagation to receive on the ground, the superior terrestrial signal on the satellite connection gate 6 due to the level fading events occurring on both gates in a de-correlated manner, and vice-versa, to receive the more favorable satellite reception signal on terrestrial connection gate 7. This is accomplished with the help of a reversing device 2 that supplies the more favorable reception signal 4 to the antenna connection point 5 for a diversity reception. Moreover, with switched diversity antennas, reversing device 2 is accordingly controlled from the RF receiver. For satellite radio with combined terrestrial support, both a satellite receiver 18 and a terrestrial receiver 19 are used, each with its own separate input, whereby each input is connected to a corresponding antenna for both satellite and terrestrial reception as shown in FIG. 4b.

Referring to FIG. 4b, there is shown an advantageous further development of the invention using a reversing device 200 connected to gates 6 and 7 which are fed to RF amplifiers 20. Present in reversing device 200 are a first reversing device 2a, and a second reversing device 2b connected to amplifiers 20, for selecting the more favorable reception signal in terms of diversity. The output of each reversing devices 2a and 2b is supplied to the corresponding input, i.e. to a terrestrial receiver 19 and, respectively, a satellite receiver 18. In this way, both the signals on satellite connection gate 6 and also on the terrestrial connection gate 7 of reception antenna 1 are alternatively available to both receiver inputs 16, 17 for the selection by the diversity processor.

The basic configurations of antennas with dipoles when combined with a similar antenna that is rotated in space by 90 degrees, and by superimposing their reception signals with a phase difference of 90 degrees, provide a directional diagram for circular polarization. Azimuthally speaking, a round diagram is always required for the signal received with circular polarization. However, different vertical diagrams are frequently required for different satellite orbits. All of the antenna configurations described in the following examples are suited for application in the present invention.

Figure 5C:
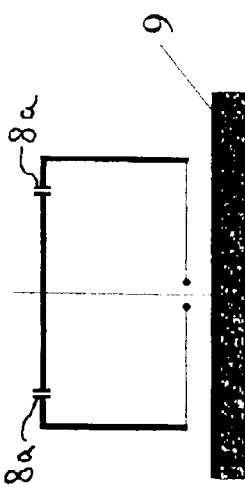
FIG. 5c shows a second frame type dipole with gaps that are capacitively wired.
Figure 5D:
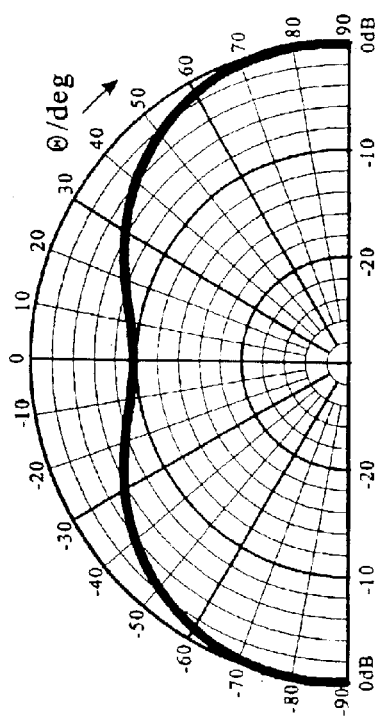
FIG. 5d shows a flattened vertical diagram for the dipole design of FIG. 5c.
Figure 5A:
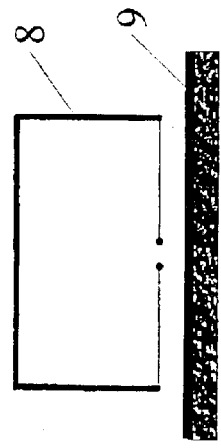
FIG. 5a shows a frame type dipole antenna over a conductive plane.
Figure 5B:
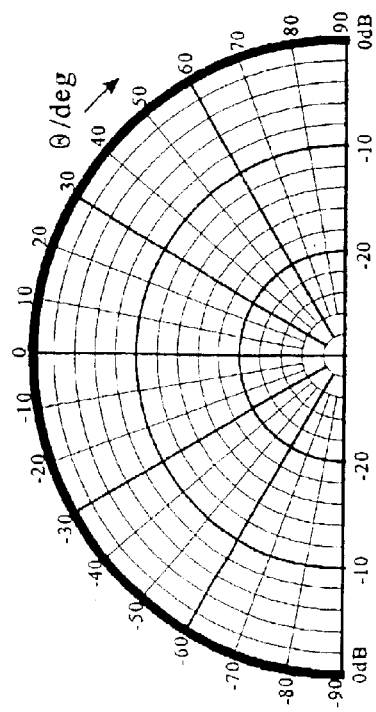

For example, FIG. 5a shows a frame type 8 dipole disposed over a conductive plane 9, with an angle-independent elevation diagram as shown in FIG. 5b. A similar frame disposed over a conductive plane 9, is shown in FIG. 5c, which, by symmetrically introducing suitably separation sites or gaps 8a that are capacitively coupled, produce the vertical diagram of FIG. 5d. The dipole antenna of FIG. 5c is designed symmetrically with respect to its center line 11. The flattening of this diagram of FIG. 5d in the area of the zenith angle, upon interconnection with an equal frame type dipole that has been rotated in space by 90 degrees, and offset by 90 degrees in phase, provides a vertical diagram that is independent of the azimuth angle within wide ranges.

Figure 6A:
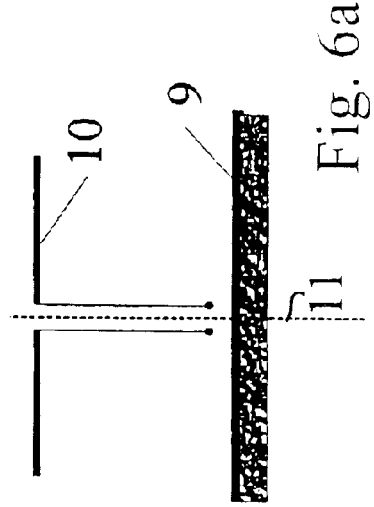
FIG. 6a shows an electrical dipole disposed over a conductive ground.
Figure 6C:
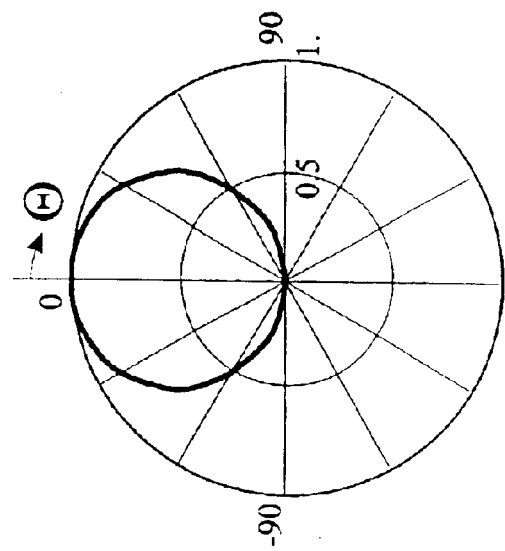
Figure 6D:
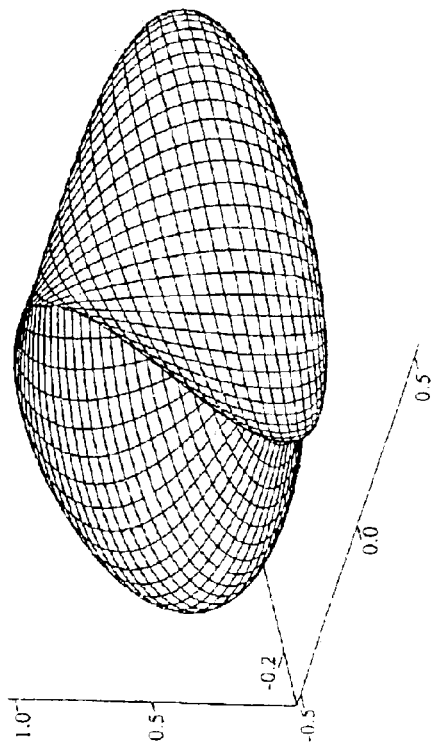
Figure 6B:
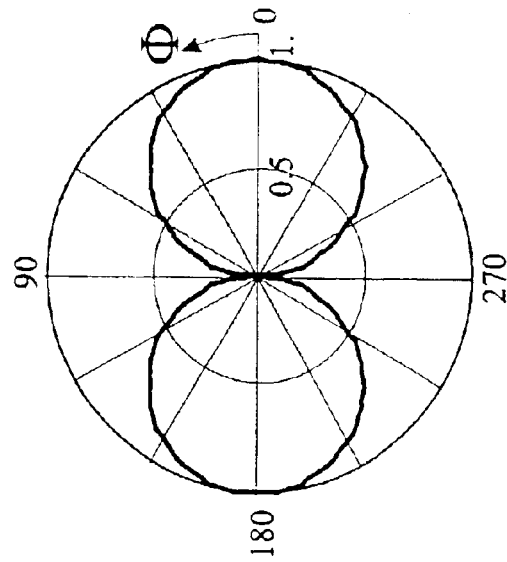

Referring to FIG. 6a, according to the invention, a horizontal dipole 10 is shown in a similar manner to FIGS. 5a and 5c, disposed over a conductive plane 9. FIG. 6b shows the horizontal diagram and FIG. 6c the vertical diagram for the dipole design of FIG. 6a. FIG. 6d shows a three dimensional directional diagram of the reception of the signal of the dipole of FIG. 6a.

Figure 7A:
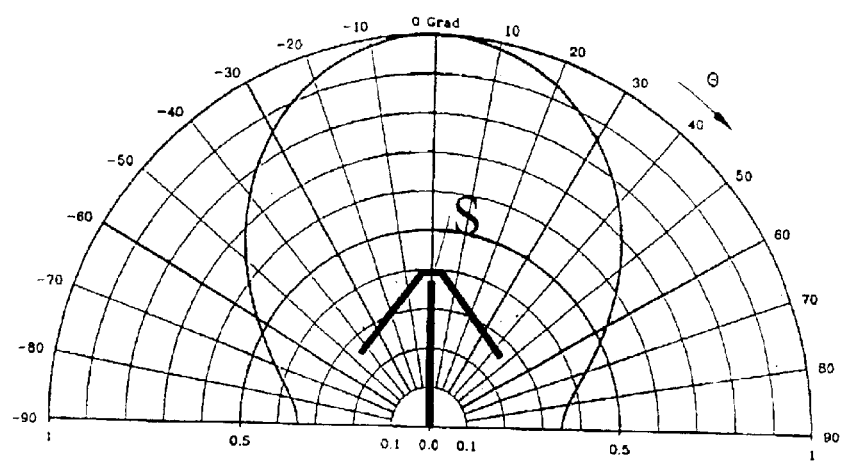
FIGS. 7a, 7b and 7c show vertical directional diagrams of differently designed antennas of the "inverted-V"-type.
Figure 7B:
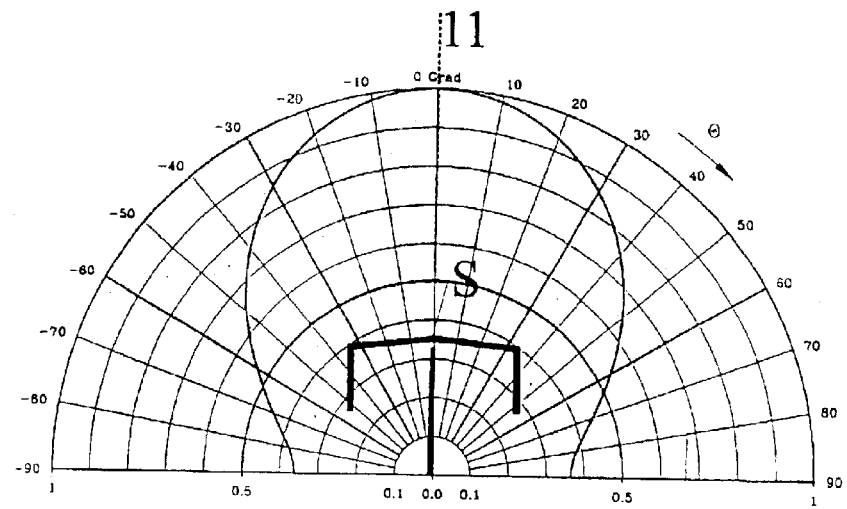
Figure 7C:
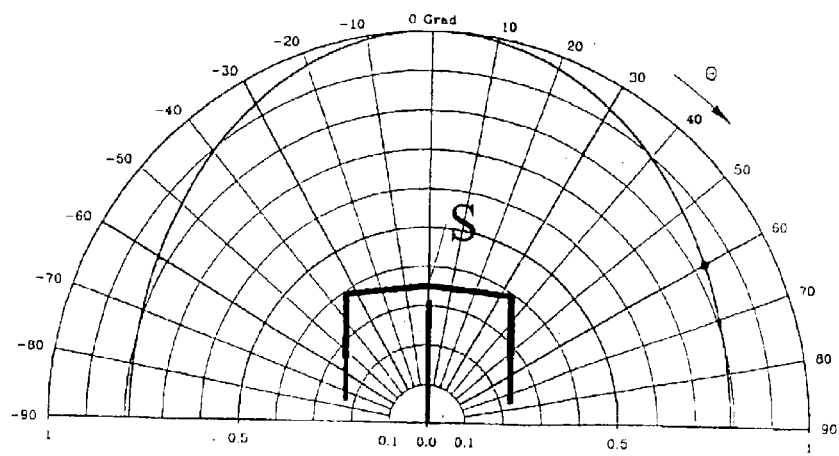

Referring to FIGS. 7a to 7c, modifications of such a dipole are shown which possess a significant vertical component for suitably or shaping the vertical diagram. What is required in particular is that the excessively elevated radiation in the range of the zenith of the dipole, which is known as the inverted V shown in FIG. 7a, has to be reduced.

In FIG. 8a there is shown a pair of monopoles M connected to gap 13 and disposed over conductive plane 9 which is known in the literature under the name U-Adcock, and create a circularly polarized diagram as well. In addition to the spatial diagram, of FIG. 8d, FIG. 8b shows the horizontal diagram, and FIG. 8c shows the vertical diagram of this arrangement. Here, monopole antennas M which are disposed over conductive base surface 9 provide reception signals at terminals 13 which are the difference signals of the monopole antennas.

All of the basic configurations of the antenna dipoles D1, D2 shown in FIGS. 5 to 8 possess an azimuthal directional diagram that is substantially independent of the elevation. Based on a spatial direction of the dipole, this azimuthal directional diagram describes a cosine-shaped directional diagram as it is shown in FIGS. 6b and 8b. By offsetting the spatial directions of the antenna dipoles D1 and D2 and by superimposing the reception voltages with a phase difference or phase angle of 90 degrees, it is possible to obtain the desired circularly polarized directional diagrams with azimuthal omni-directional radiation with all dipole antennas of this type. The difference of the circularly polarized directional diagrams is thus limited to the vertical diagram.

Figure 9A:
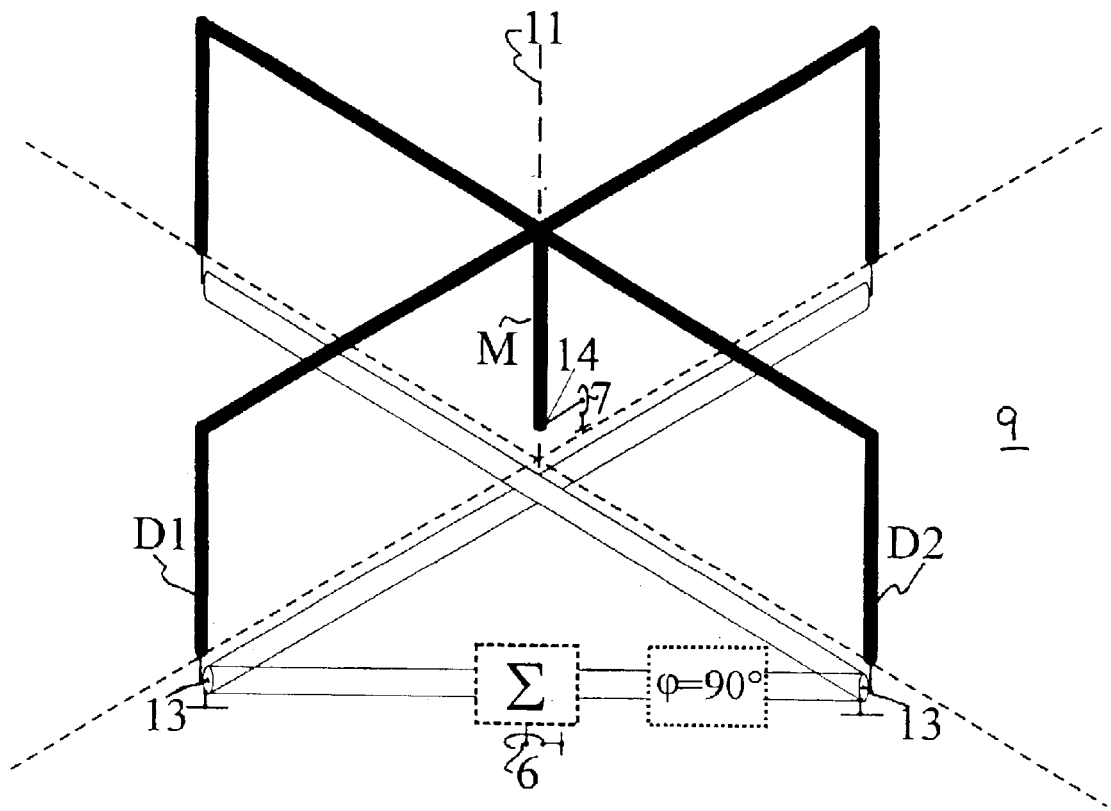
FIG. 9a shows an antenna arrangement as defined by the invention with dipole antenna with a terrestrial connection gate and a satellite connection gate.
Figure 9B:
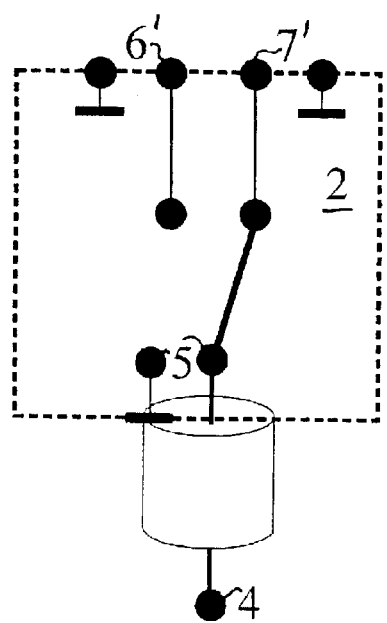

FIGS. 9a and 9b shows a reception antenna arrangement of the invention with a reception antenna 1 using the frame type dipole antenna shown in FIG. 5a. To provide a satellite connection gate 6, the frame antenna is symmetrized with cables with a wave length of λ/2, and the frame voltages so obtained are in phase by 90 degrees and summed up, so that the circularly polarized directional diagram is formed on the satellite connection gate 6. Because of the symmetry, it is possible to introduce along centerline 11 a vertically polarized antenna M with a dipole design. This antenna M contains a terrestrial connection gate 7 at its lower end. In a manner similar to the one described in connection with FIG. 4a, satellite connection gate 6 and terrestrial connection gate 7 are connected to the inputs of reversing device 2, at inputs 6' and 7' so that both signals for the diversity function are alternatively formed on the output of reversing device 2 in the antenna connection site 4 for diversity reception.

Figure 10A:
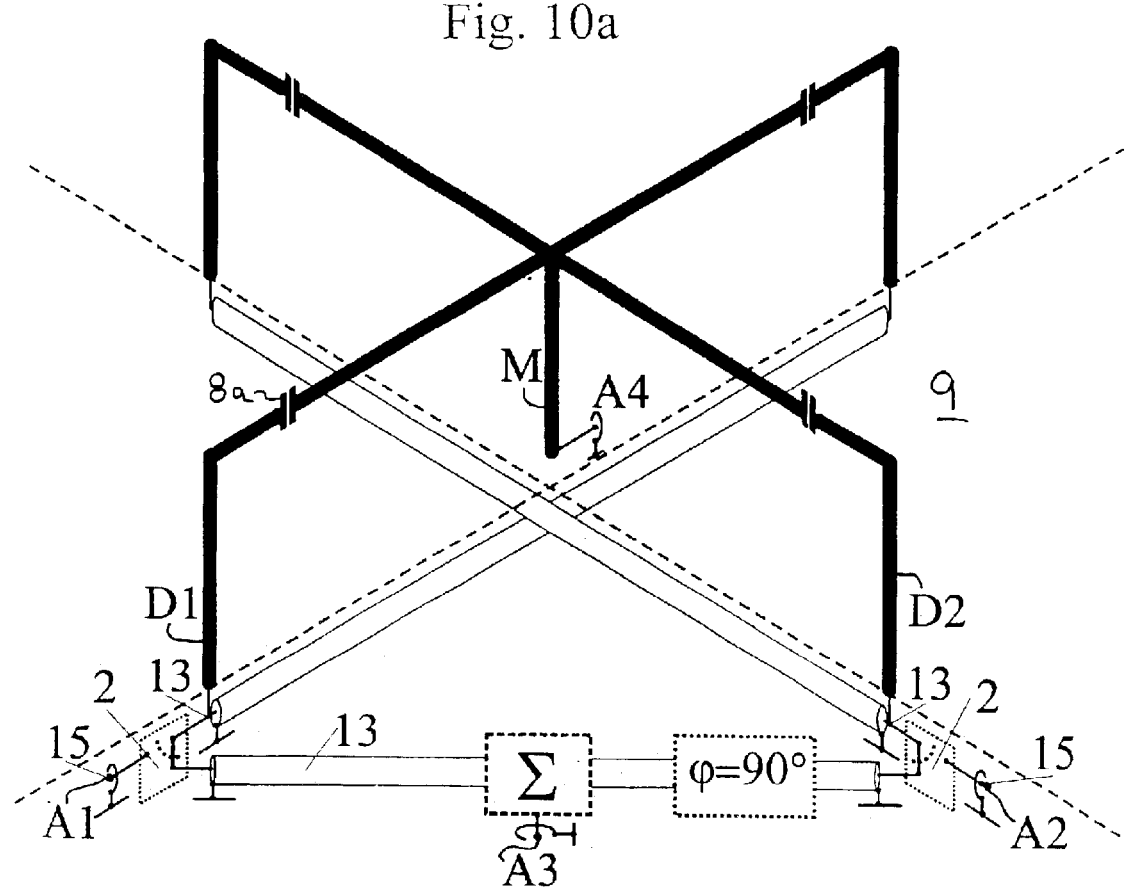
FIG. 10a shows an antenna arrangement as defined by the invention with dipole device with a terrestrial connection gate and a satellite connection gate.

In another advantageous embodiment of the invention, the reversing device 2 as employed in FIG. 4b, is used to obtain a diversity function with this configuration of the antennas for both satellite receiver 18 and terrestrial receiver 19. To form additional reception signals in terms of diversity, additional reversing devices 2 are employed, which are designed and incorporated in the reception antenna system so that the superimposition of the dipole reception signals with a phase angle or difference of 90 degrees is interrupted by reversing, and the signals are alternatively available on a separate dipole output A1 or A2 by selectable reversal as shown in FIG. 10a. The number of signals that are available independently of each other is substantially increased in this way.

An objective of the invention is to provide a diversity efficiency as extensive as possible, so that the error probability $p_d$ discussed above is notably reduced. The error probability was defined earlier as follows:

$$p_d = \frac{\sum_v \Delta t_{vd}}{t_{tot}}$$

In comparison to the error probability with one individual antenna, this results in the diversity efficiency n of the diversity antenna system where $n=q_d/q_s$. The interference probability is reduced to $p_d$ by using a diversity function. The diversity efficiency n is thus stated as the ratio of the signal quality $q_d$ in the diversity mode, to $q_s$ in the single-antenna mode during a drive in the same Rayleigh reception field. The signal quality q is defined in the same manner.

A notable diversity efficiency requires that the individual reception signals be independent of each other. For the reception antenna arrangements as defined by the invention and shown, comparatively high values are obtained for n in the Rayleigh reception field because of the variability of the azimuthal directional diagrams based in one spatial direction, or the different azimuthal phase responses of the individual antennas with dipole nature.

Figure 10B:
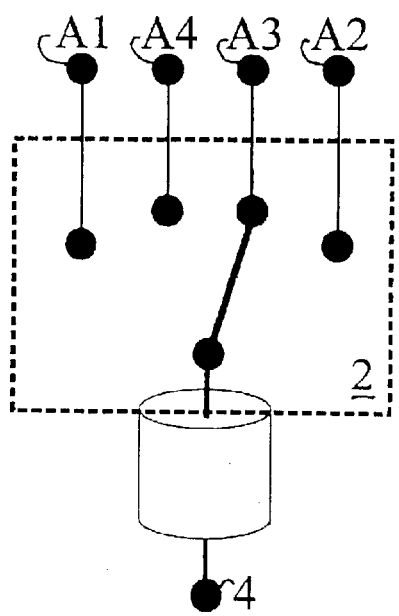
Figure 11A:
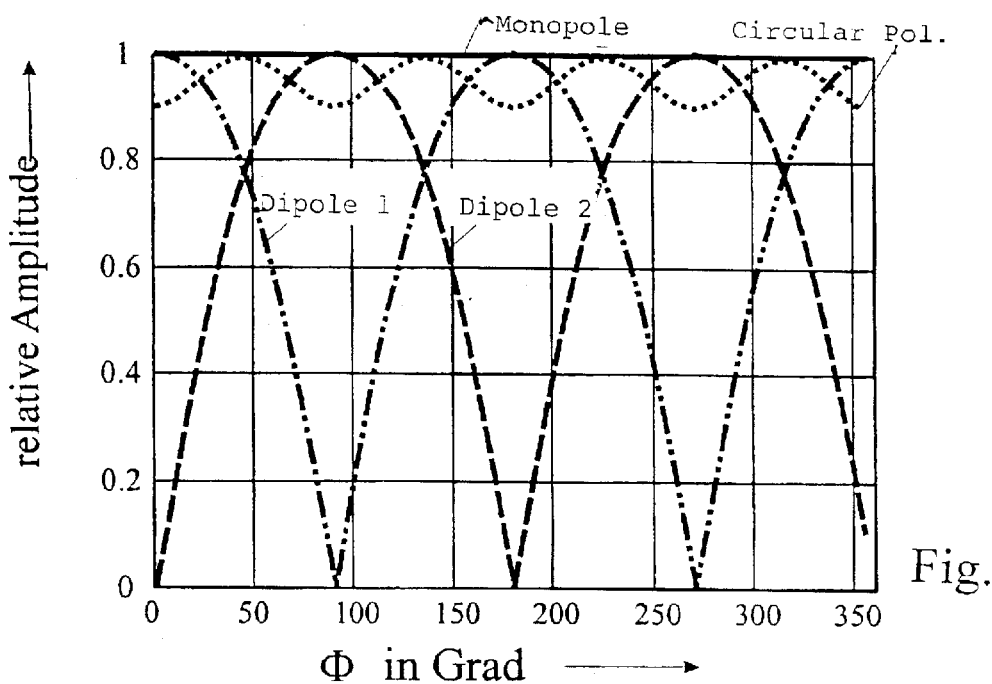
FIGS. 11a and 11b show the relative amplitude and the phase response of antennas as defined by the invention with dipole antennas over the azimuth angle Φ.
Figure 11B:
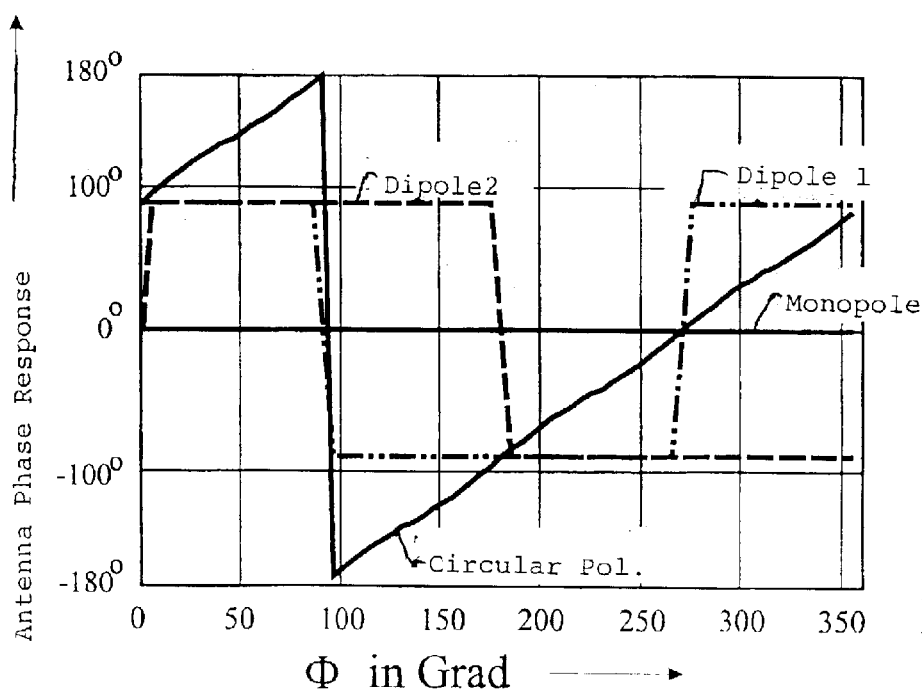

Basic configurations of these diagrams of an antenna in FIGS. 10a and 10b are shown in FIGS. 11a and 11b for the dipole D1 (connection A1) and dipole D2 (connection A2); for the connection for circular polarization (connection A3), and for the monopole (connection A4); for the relative dependency on the amplitude, and in FIG. 11b for the azimuthal dependency on the phase.

Thus, in FIGS. 10a and 10b the reception voltages of both dipoles D1 and D2 of the antenna in FIG. 9a and 9b are therefore additionally made available separately to the diversity function, in the sense of an expansion of the diversity function of the reception antenna arrangement 100. For this purpose, the additional reversing devices 2 are introduced to form additional reception signals that are independent in terms of diversity. These signals are configured and introduced in the reception antenna arrangement so that the superimposition of the dipole reception signals 13 with a 90-degree phase difference (or angle) is interrupted by reversing, and the dipole reception signals 13 are alternatively available on the separate dipole outputs A1 and A2 by selectable reversal. This substantially raises the achievable diversity efficiency n.

Figure 12:
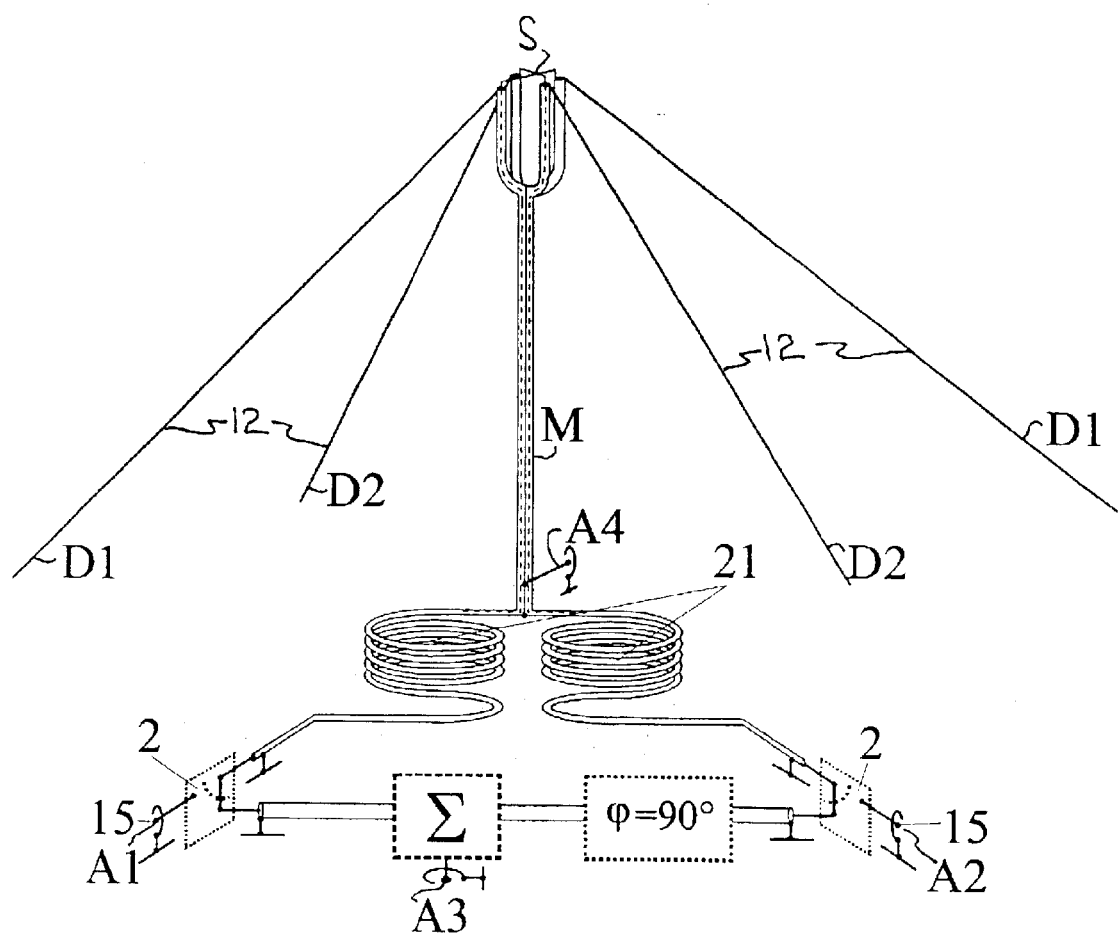
FIG. 12 shows an antenna arrangement as defined by the invention with dipole antenna and with dipoles of the "inverted-V"-type, and a high-frequency, separation for uncoupling the terrestrial reception signal.

In a reception antenna arrangement 100 as defined by the invention that is efficient to the same degree, an antenna with substantially horizontal dipoles is used above a horizontally oriented, conductive base surface 9. To create a vertically polarized antenna M with dipole character, terrestrial connection gate 7 is formed in the carrier of the symmetrically supplied dipoles D1 and D2 by a high-frequency separator circuit 21 at the foot of this carrier as shown in FIG. 12. Here, the electrical dipoles both extend horizontally and vertically in a declining expanse starting from its symmetry point S to form an inverted V-dipole. The outputs of separator circuit 21 are connected to reversing devices 2 for selecting the reception signal that is actually more favorable to satellite receiver 18. Even though azimuthal omni-reception of the signal amplitude is obtained on both outputs A3 and A4, the azimuthal phase responses of the signals on the two outputs are basically different.

FIG. 11 shows the azimuthal phase responses with the phase on the output of the summation circuit A3 that are linearly changing with the azimuth angle, and with the azimuthally independent phase response on the output A4. When the greater of the two signals with a switching diversity is selected in a vehicle moving in the Rayleigh reception field, a diversity effect of n=1.9 antennas is obtained. Approximately applicable is the relation of $p_d = p_s^2$, whereby $p_d$ describes the interference occurrence probability in the 2-antenna diversity mode conditioned by signal fading, and ps the interference occurrence probability in the single-antenna mode in the same Rayleigh field. The reduction of the error probability is thus supplied by:

$$F_{red} = p_d/p_e = p_e^{(n-1)}$$

Furthermore, the two additional diversity antenna outputs A1 and A2 are created. Accordingly, together with output A3 for circularly polarized signals, and output A4 for azimuthal omni-reception, up to 3 signals are available in terms of diversity. The table below shows the number n of equivalent signals, which are statistically independent of each other according to the above definition when using the signals occurring on the respective outputs in a switching diversity arrangement.

Due to the variability of these diagrams in FIGS. 11a and 11b, the following values are obtained, for example for the connections A1 to A4 for an antenna arrangement in FIG. 10 for the diversity efficiency for both the terrestrial signals and the satellite signals incident at an elevation that is not too high:

| Number of outputs: | | | | n |
|---|---|---|---|---|
| A1, | A2 | | | 1.95 |
| A1 | | A3 | | 1.5 |
| A1 | | | A4 | 1.94 |
| | A2 | A3 | | 1.5 |
| | A2 | | A4 | 1.9 |
| | | A3 | A4 | 1.9 |
| A1 | A2 | A3 | A4 | 3.1 |

Figure 13:
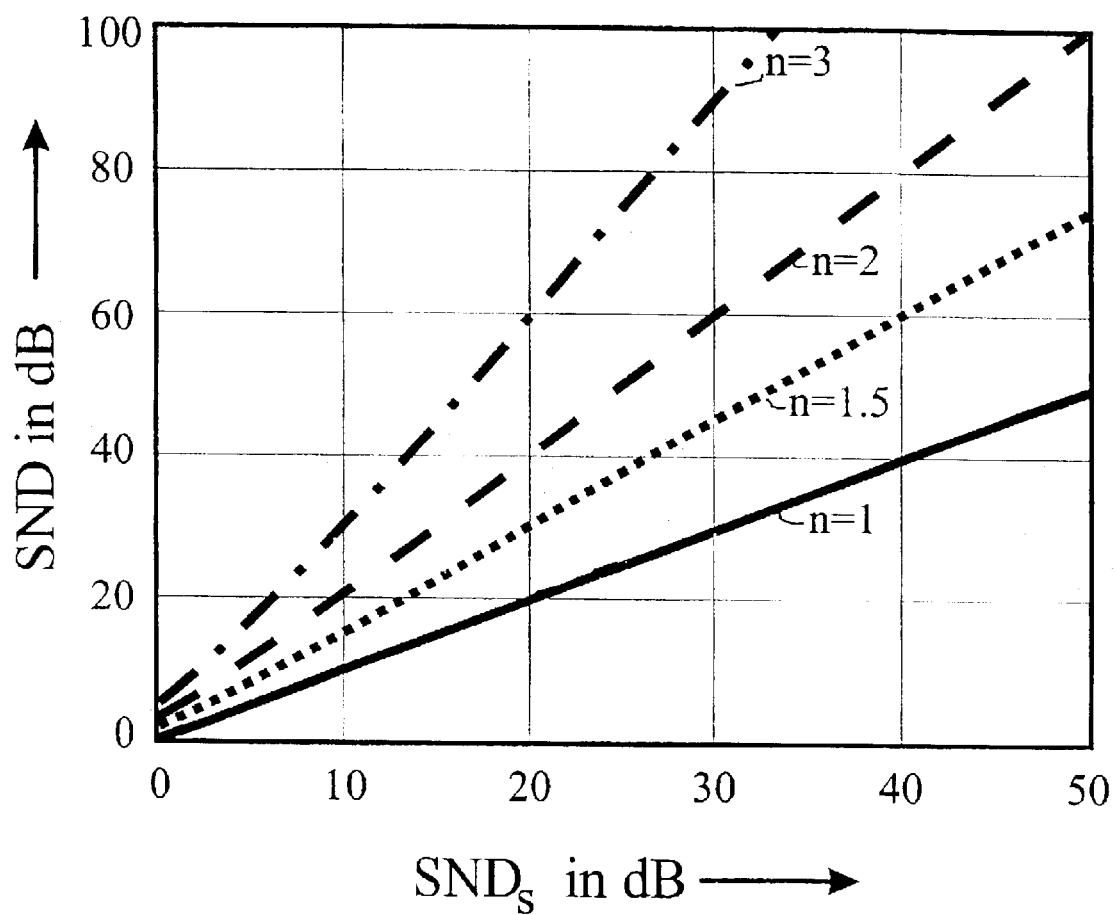
FIG. 13 shows a chart of the signal/noise distance in the diversity mode with respect to the signal-to-noise level of an individual antenna SNDs for different values of the diversity efficiency.

To show the improvement achieved with the invention, FIG. 13 shows the error probability $p_d$ in the diversity mode as a function of SNDs. In this figure, $SND_s$ denotes the signal-to-noise ratio as the ratio in dB between the effective value of a level $U_m$ received in the Rayleigh field with a single antenna, and the noise threshold $U_{min}$. This regularity can be derived from the relations stated in FIG. 14, whereby $U_n$ represents the noise voltage, and $SNR_{min}$ represents the minimally required signal-to-noise distance. This reduction in the interference probability can be perceived as a fictitious elevation of the signal-to-noise ratio denoted by SND that would have to be offered to an individual antenna with the same interference probability over the same distance of travel. With a preset noise voltage $U_n$, this means a fictitious elevation of the effective value $U_m$ by the amount stated in FIG. 13. This elevation is, in turn, a function of $SND_s$ that is represented in FIG. 13 for various values of n. Thus, the curve of the function for n=2, shows that when the connections A3 and A4 are exclusively used, there is a notable improvement of the reception in the diversity mode.

Figure 14:
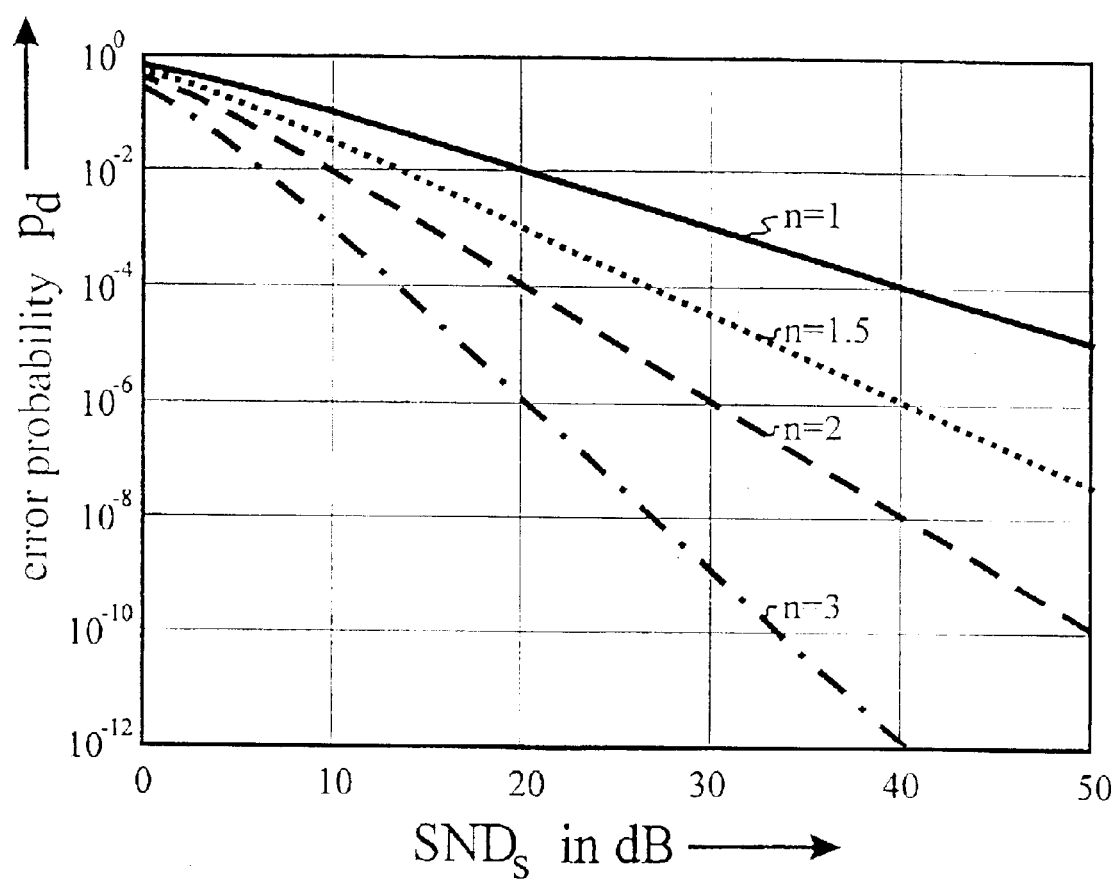
FIG. 14 shows the error probability in the diversity mode with respect to the signal-to-noise level of an individual antenna for different values of the diversity efficiency; and, FIGS. 15a and 15b show an antenna arrangement as defined by the invention with diversity systems for both satellite and terrestrial reception that are independent of each other and each have access to all available antenna signals.

FIG. 14 shows the error probability $p_d$ in the diversity mode with respect to the signal-to-noise level of an individual antenna SND for different values of the diversity efficiency n. The followings is a mathematical derivation;

$$p(U^2) = \frac{1}{U_m^2} \cdot e^{\frac{U^2}{U_m^2}}$$

$$U_{min}^2 = U_n^2 \cdot SNR_{min} = 4 \cdot k \cdot T_R \cdot B \cdot R \cdot SNR_{min}$$

$$p_s = \int_0^{U_{min}^2} p(U^2) \cdot dU^2 = \int_0^{U_{min}^2} \frac{1}{U_m^2} \cdot e^{\frac{U^2}{U_m^2}} \cdot dU^2 = 1 - e^{\frac{U_{min}^2}{U_m^2}}$$

$$p_d = p_s^n = \left(1 - e^{\frac{U_{min}^2}{U_m^2}}\right)^n$$

$$SND_s = 20 \cdot \log(U_m / U_{min})$$

Figure 15A:
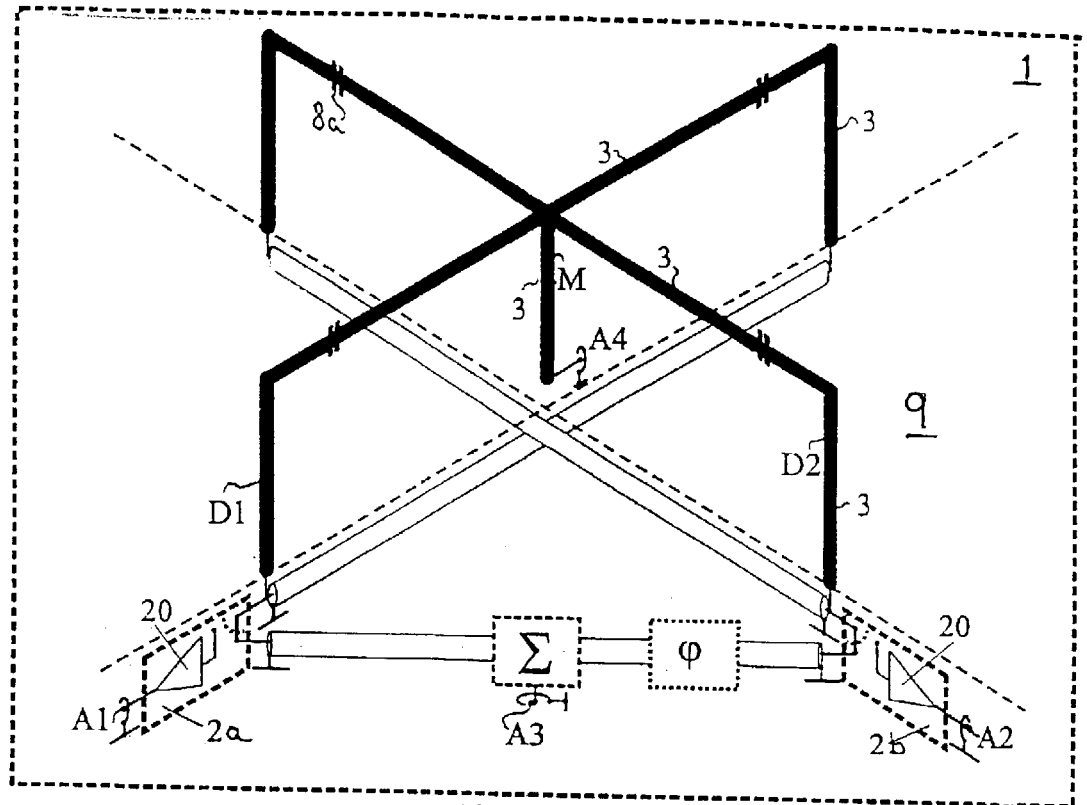
Figure 15B:
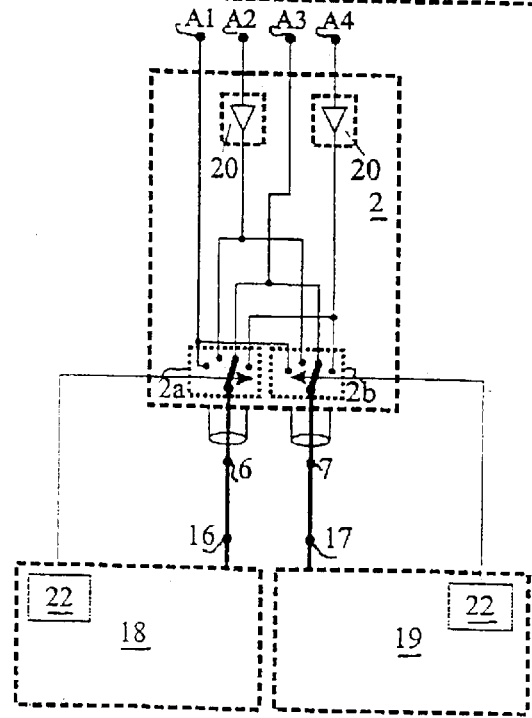

The antenna arrangement of FIG. 15 shows how it is possible by means of amplifiers 20 to guarantee that the impedance and load conditions occurring on the individual gates 6 and 7 will not impair the reception signals, and how it is possible to protect the division of the output signals against distortion. Furthermore, according to the invention, diodes instead of the switches 2a, 2b in FIG. 4b and FIG. 15a, b respectively can be provided that can be controlled by blocking and passage-permitting elements required for the reversing processes as such.

While only a few embodiments of the present invention have been shown and described, it is to be understood that many changes and modifications may be made thereunto without departing from the spirit and scope of the invention as defined in the appended claims.

What is claimed:

1. A reception antenna arrangement for diversity reception for motor vehicles for the GHz frequency range, for disposal over a conductive, horizontally oriented base surface for the reception of circularly polarized waves and/or vertically polarized waves comprising:

a plurality of dipole antennas extending spatially not more than ¾ of the wavelength;

at least one reversing device (2) coupled to said dipole antennas for receiving at least two signals of different diversity, and alternatively coupling said signals to at least one antenna connection point (5) for diversity reception, so that a more favorable reception signal (4) or a plurality of receptions signals (4) can be selected by said reversing device (2) to substantially reduce interference and enhance the quality of the received signals;

wherein said plurality of dipole antennas comprise:

two dipole antennas (D1, D2) oriented vertically in relation to each other, the azimuthal directional diagrams of which are cosine-shaped and have dipole reception signals (13) superimposed with a 90-degree phase angle;

a satellite connection gate (6) allocated to satellite reception;

a terrestrial connection gate (7) allocated to the terrestrial reception; and a vertically polarized dipole antenna M for receiving the terrestrially transmitted signals, and supplying those signals to said terrestrial connection gate (7).

2. The reception antenna arrangement according to claim 1 comprising:

a satellite receiver (18) having its input connected to the connection point for diversity reception (5) for the coordinated reception circularly polarized satellite signals;

a frequency diversity separator (21) disposed in said receiver for controlling said reversing devices (2) for selecting the reception signal (4) that is actually more favorable to the satellite receiver (18), and a terrestrial receiver (19) having its input connected to said terrestrial connection gate (7) for the reception of vertically polarized terrestrial signals.

3. The reception antenna arrangement according to claim 1 additionally comprising a satellite receiver (18), and a terrestrial receiver (19) for the coordinated reception of circularly polarized satellite signals and vertically polarized, terrestrially transmitted signals respectively from said two dipole antennas, wherein the antenna connection point (5) for diversity reception is connected to the input of said terrestrial receiver (19), and a diversity processor (21) for controlling said at least one reversing device (2) in said receiver, so as to select the reception signal (4) that is actually more favorable to the terrestrial receiver (19) in terms of diversity, and wherein said satellite connection gate (6) is additionally connected to the input of said satellite receiver (18).

4. The reception antenna arrangement according to claim 1 wherein said at least one reversing device (2) comprises:

a first reversing device (2a) for selecting the more favorable reception signal (4) in terms of diversity for a satellite receiver; and, a second reversing device (2b) for selecting the more favorable reception signal (4) in terms of diversity for a terrestrial receiver, said receivers being designed so that each receiver is supplied on the input side with both the reception signal on the satellite connection gate (6) and the reception signal on the terrestrial connection gate (7), and said at least one antenna connection point (5) is connected to their outputs for diversity reception, of which one point is connected with the input of the satellite receiver (18) and the other point is connected with the input of the terrestrial receiver (19), and each of the two receivers contains a diversity processor (21) for controlling said two reversing devices (2a, 2b), so as to select the actual more favorable reception signal (4) in terms of diversity for the respective receiver.

5. The reception antenna arrangement according to claim 1, comprising:

at least one additional reversing device (2) in order to form additional independent reception signals in terms of diversity, the latter being designed so that the superposition of the dipole reception signals (13) with a 90-degree phase difference is interrupted by a reversal, and that at least one of the dipole reception signals (13) is alternatively available on a separate dipole output (A1 and A2, respectively) by a selectable reversal.

6. The reception antenna arrangement according to claim 1, wherein said reversing device comprises a first reversing device (2a) for forming independent reception signals in terms of diversity, and incorporated in the reception antenna arrangement for the exclusive reception of circularly polarized satellite signals, wherein no separate, vertically polarized dipole antenna (M) is present; so that in the event of interruption of the superpositioning of the dipole reception signals (13) with a 90-degree phase difference by reversal, one of the dipole reception signals (13) is alternatively available on a separate dipole output (A1), and in this switching condition, the dipole reception signals (13) of the other dipole are thus available on said satellite connection gate (6);

a second reversing device (2b) supplied on its input with the signals of the separate dipole output (e.g. A1) and the satellite connection gate (6), so that during a coordinated reversal of said first and second reversing devices (2a, 2b) both of the different dipole reception signals (13) in terms of diversity, and the circularly polarized satellite signals are alternatively available for optimum diversity reception at the output of the radio system.

7. The reception antenna arrangement according to claim 1 wherein said reversing device is coupled to both of said connection gates (6,7) wherein the signals on said connection gates (6) and (7) are alternatively supplied to the antenna connection point for coordinated diversity reception of circularly polarized satellite signals and vertically polarized terrestrially transmitted signals.

8. The reception antenna arrangement according to claim 1, wherein said two dipole antennas (D1, D2) comprise:

frame type antennas (8) of the same type disposed on the conductive, base surface (9), wherein their frame areas each are substantially oriented vertically in relation to the base surface, and wherein the vertically polarized dipole antenna is a vertical monopole disposed above the conductive basic surface (9).

9. The reception antenna arrangement according to claim 8, wherein said frame type dipole antennas (D1, D2) are disposed above the conductive, base surface (9), and have their frame area oriented, in each case, vertically in relation to said base surface (9), wherein both frame antennas are symmetrical in relation to their vertical centerline (11) and include gaps formed in the frame symmetrically in relation to the vertical centerline (11);

capacitive reactive elements loaded in said gaps so that the vertically polarized dipole antenna comprises a vertical monopole antenna (M) disposed over the conductive base surface (9).

10. The reception antenna arrangement according to claim 1, wherein said two dipole antennas (D1, D2) comprise a pair of substantially horizontally crossed, electrical dipoles (10) disposed above the conductive base surface (9), said electrical dipoles (10) being disposed symmetrically in relation to a vertical centerline (11), and said vertically polarized dipole antenna comprises a vertical monopole antenna (M) disposed above the conductive base surface (9).

11. The reception antenna arrangement according to claim 10, wherein each of said two crossed electrical dipoles (10) extends both horizontally and vertically in a declining expanse starting from its symmetry point (S), to form an inverted V-dipole (12).

12. The reception antenna arrangement according to claim 1, wherein said two dipole antennas (D1, D2) comprise two pairs of vertically oriented, electrical monopole antennas (M) arranged on the ends of one of the diagonal lines of a square disposed on the conductive base surface (9), whereby the reception voltages of said monopole antennas (M) of each pair of said antennas form the dipole reception signals (13) of said two dipole antennas (D1, D2) by forming the difference.

13. The reception antenna arrangement according to claim 12, wherein said vertically oriented dipole antenna (M) provides the sum of the monopole reception signals (14) of all four monopole antennas to preserve the symmetry of the arrangement.

14. A reception antenna arrangement for diversity reception for motor vehicles for the GHz frequency range, for disposal over a conductive, horizontally oriented base surface for the reception of circularly polarized waves and/or vertically polarized waves comprising:

a plurality of dipole antennas extending spatially not more than ¾ of the wavelength;

at least one reversing device (2) coupled to said dipole antennas for receiving at least two signals of different diversity, and alternatively coupling said signals to at least one antenna connection point (5) for diversity reception, so that a more favorable reception signal (4) or a plurality of receptions signals (4) can be selected by said reversing device (2) to substantially reduce interference and enhance the quality of the received signals; and amplifier arrangements (20) with low inherent noise (LNA), in said reversing devices (2), so that the impedance and load conditions occurring on said individual gates (6, 7) do not impair the reception signals, and the division of the output is made possible without interference, and comprising controllable diodes serving as blocking and passage-permitting elements required for the reversing processes.

* * * * *